Dec. 12, 1950     B. D. McINTYRE     2,534,047
SPRING SEAT CONSTRUCTION
Filed Dec. 11, 1944     4 Sheets-Sheet 1
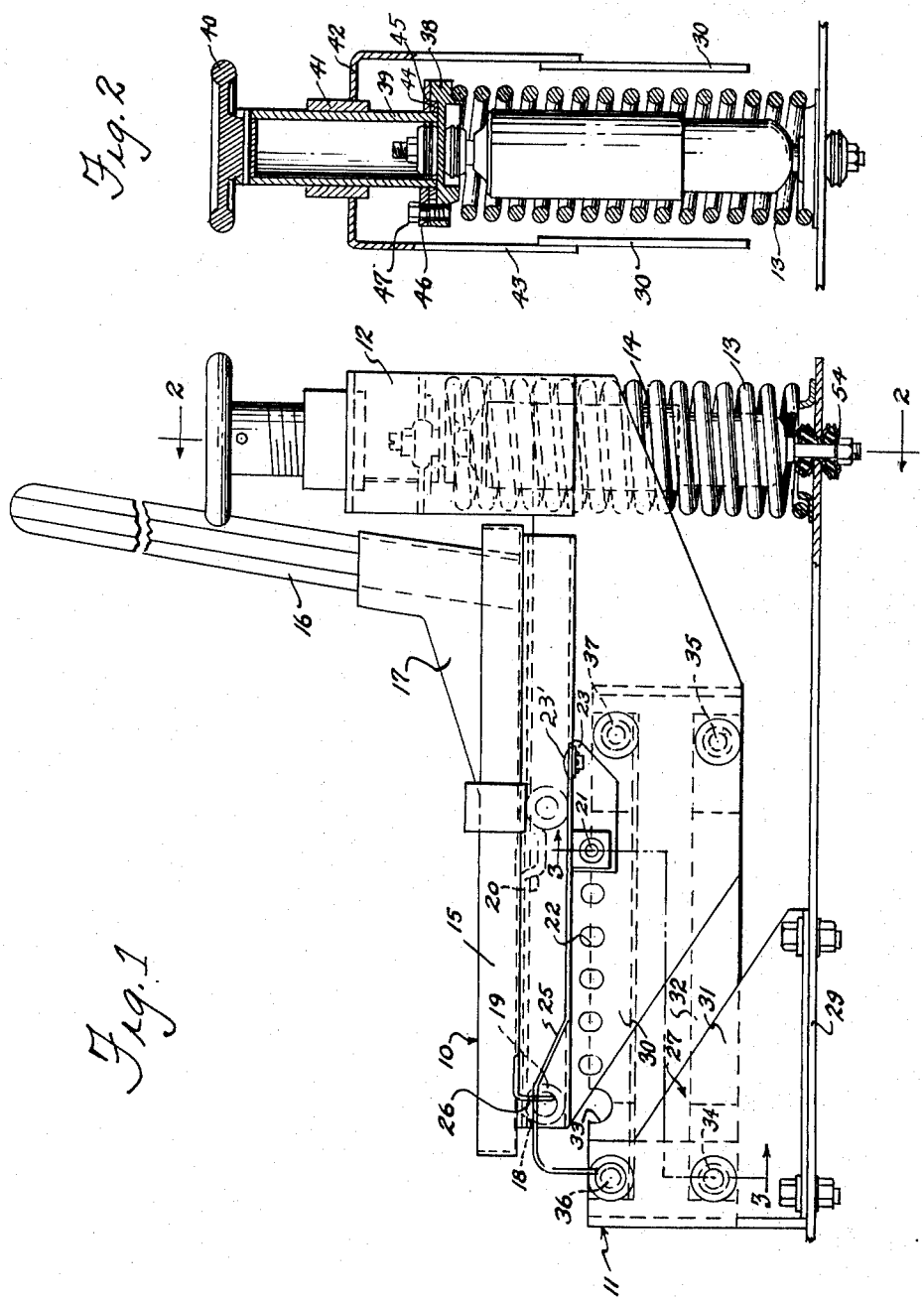
INVENTOR.
BROUWER D. McINTYRE
BY
Whittemore Hulbert & Belknap
ATTORNEYS

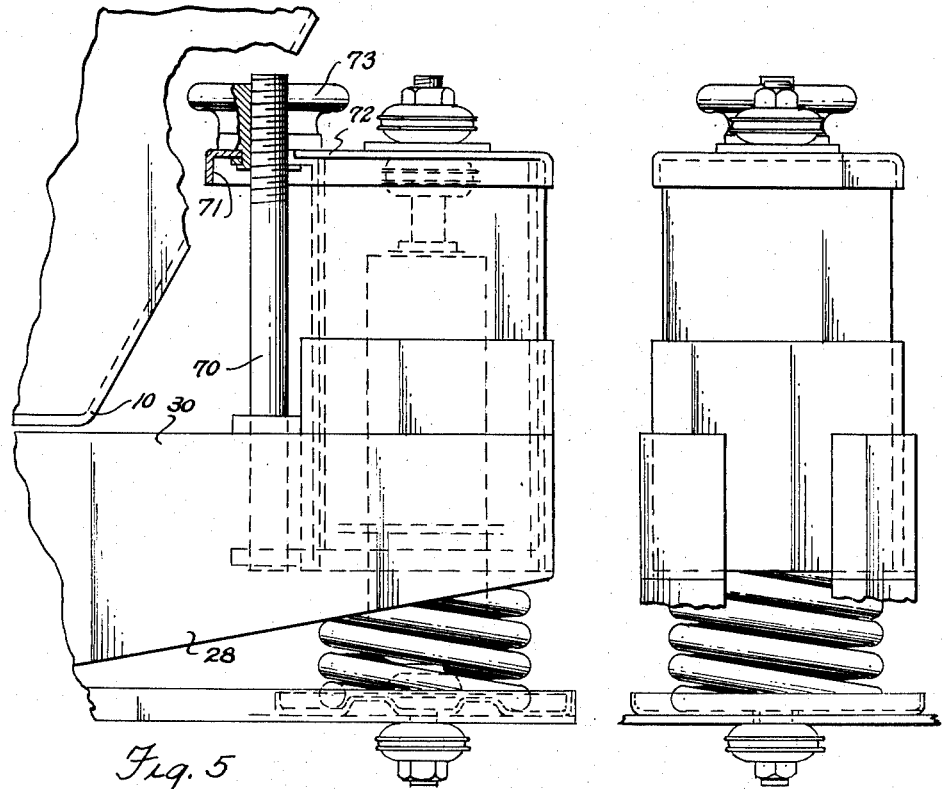
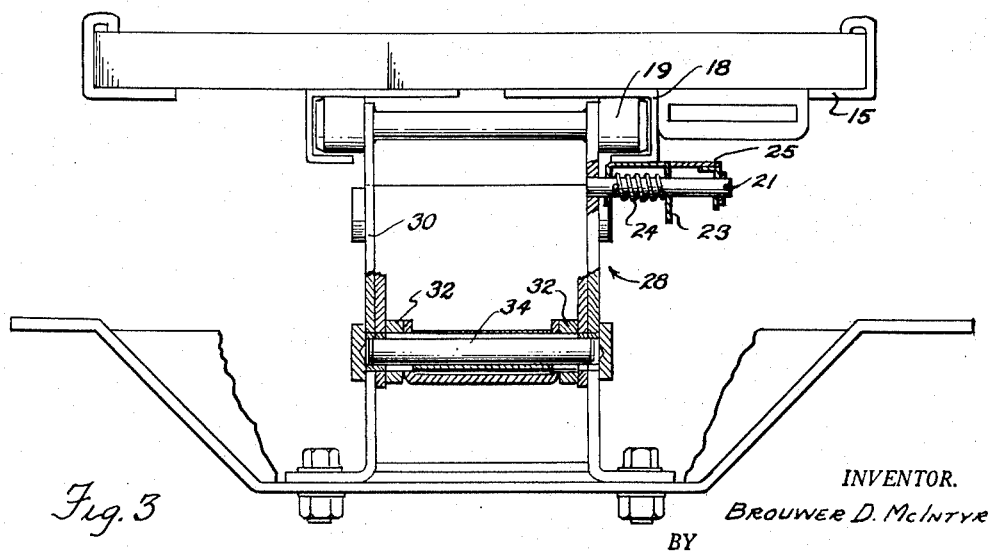

Dec. 12, 1950     B. D. McINTYRE     2,534,047
SPRING SEAT CONSTRUCTION

Filed Dec. 11, 1944     4 Sheets-Sheet 3

INVENTOR.
BROUWER D. McINTYRE
BY
Whittemore Hulbert & Belknap
ATTORNEYS

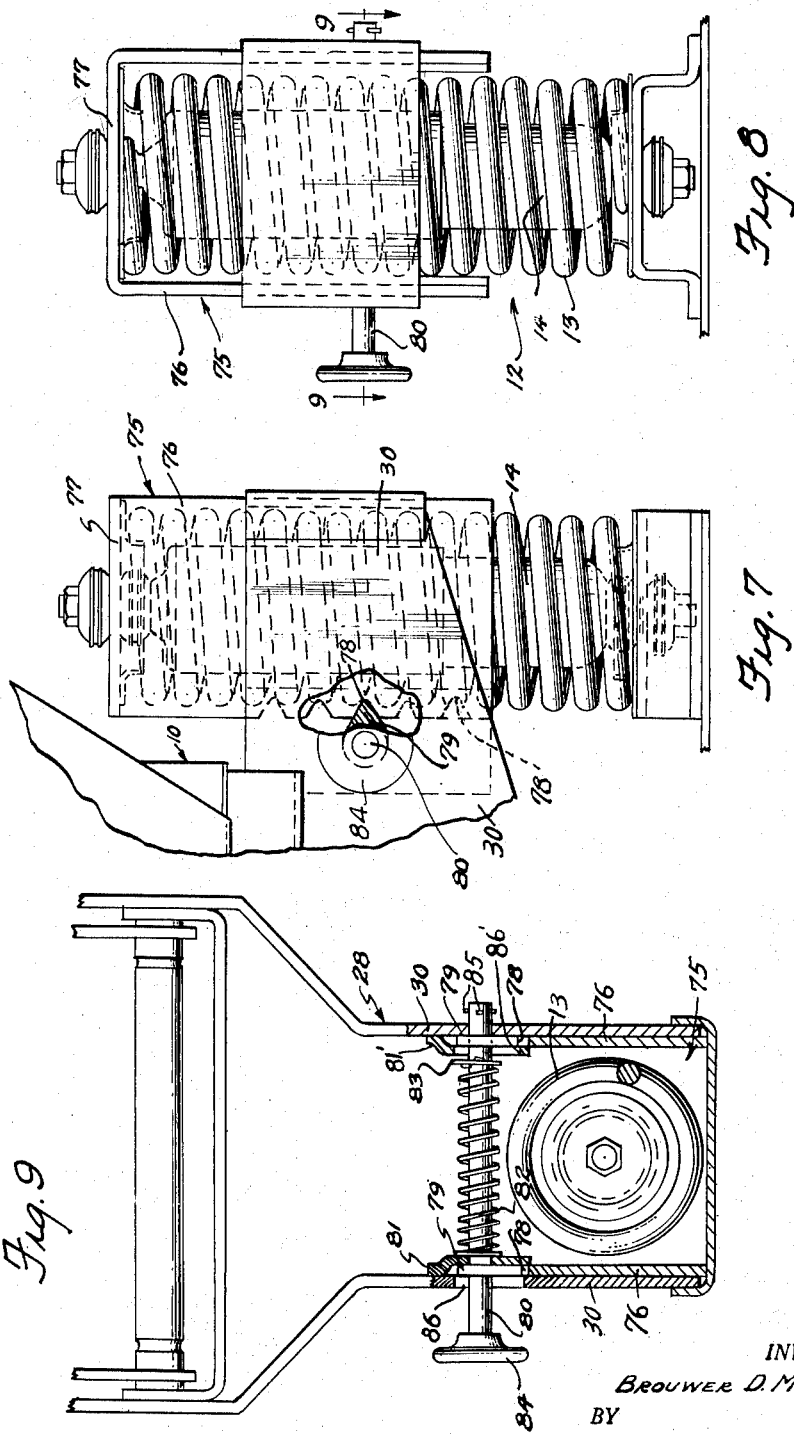

Patented Dec. 12, 1950

2,534,047

UNITED STATES PATENT OFFICE 2,534,047

SPRING SEAT CONSTRUCTION

Brouwer D. McIntyre, Monroe, Mich., assignor to Monroe Auto Equipment Company, Monroe, Mich., a corporation of Michigan Application December 11, 1944, Serial No. 567,643

3 Claims. (Cl. 155—9)

This invention relates to vehicle seats and refers more particularly to improvements in vehicle seat assemblies embodying spring supporting means.

One of the principal objects of this invention is to provide a vehicle seat assembly having a spring mounting for absorbing shocks imparted to the seat through the conventional suspension system when the vehicle passes over uneven or rough road surfaces and having means for damping the action of the spring in the form of a shock absorber.

Another feature of this invention is to provide a relatively simple compact seat supporting unit embodying a coil spring and a tubular direct acting shock absorber extending axially of the spring within the latter. As a result, the seat supporting unit occupies the minimum space in the vehicle and does not materially increase the over-all size of the seat assembly.

Still another object of this invention is to provide a vehicle seat assembly supported on vertically spaced parallel arms arranged beneath the seat proper to insure substantially straight line up and down movement.

A further feature of this invention is to provide a vehicle seat assembly wherein the seat supporting unit is supported at the rear of the seat where it does not interfere with or restrict the elevation of the seat in the vehicle body and where the shock absorber of the seat supporting unit resists forward "pitching" motion of the seat.

A still further object of this invention is to provide a seat assembly of the type outlined above having means for adjusting the elevation as well as the fore-and-aft position of the seat in the vehicle body.

The foregoing as well as other objects will be made more apparent as this description proceeds, especially when considered in connection with the accompanying drawings, wherein—

Figure 1 is a side elevation of a vehicle seat embodying the features of the present invention and having certain parts broken away for the sake of clearness;

Figure 2 is a longitudinal sectional view taken substantially on the plane indicated by the line 2—2 of Figure 1;

Figure 3 is a sectional view taken substantially on the plane indicated by the line 3—3 of Figure 1;

Figure 5 is a fragmentary elevation of a slightly modified construction and also having certain parts broken away for the sake of clearness;

Figure 6 is a fragmentary end elevation of the construction shown in Figure 5;

Figure 7 is a side elevation of a portion of a seat assembly and showing a further embodiment of the invention;

Figure 8 is an end elevation of the construction shown in Figure 7, and

Figure 9 is a cross sectional view taken substantially on the plane indicated by the line 9—9 of Figure 8.

Figure 4:
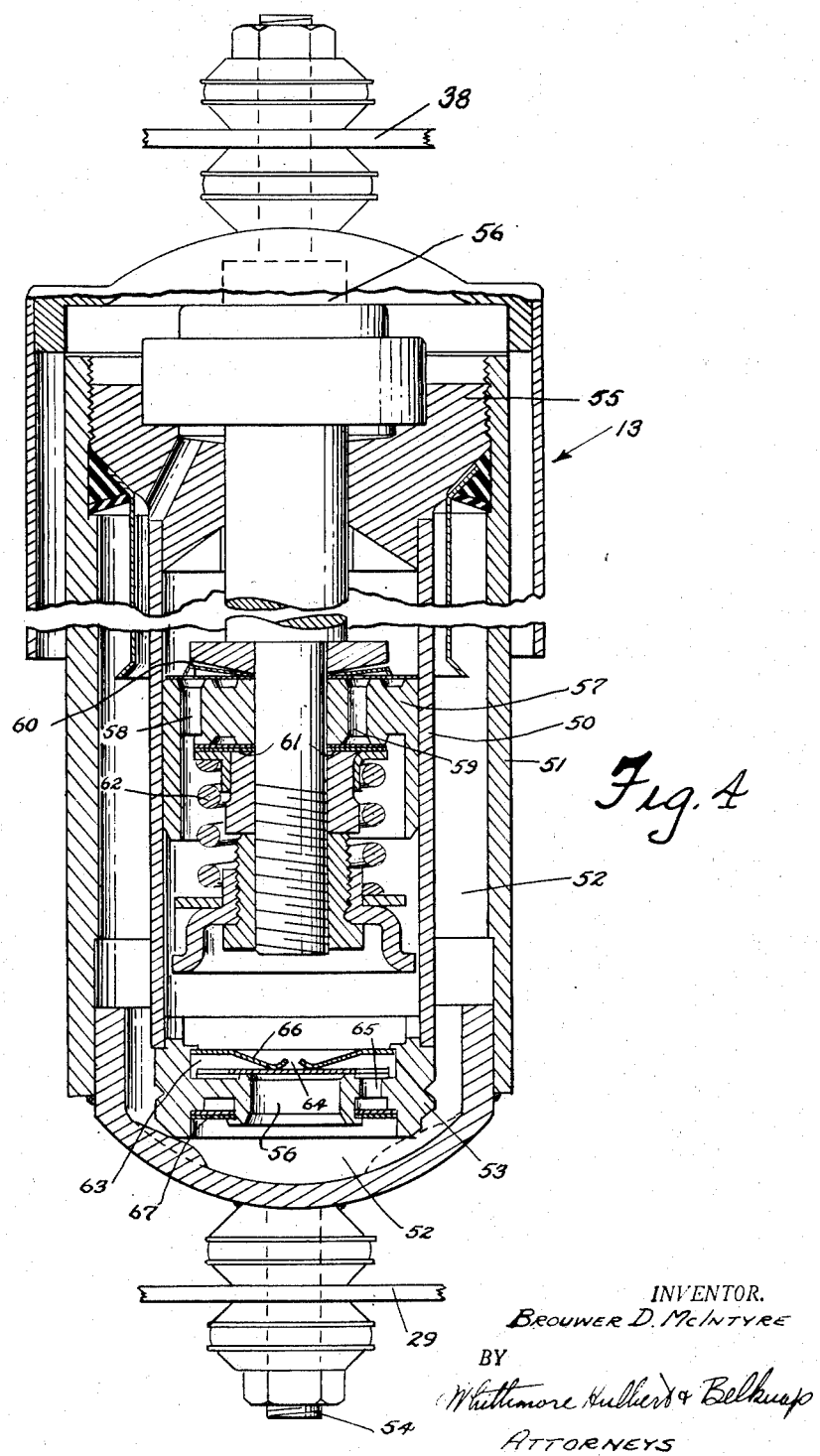
Figure 4 is a sectional view through the shock absorber provided in the seat supporting unit.

Referring now to the embodiment of the invention shown in Figures 1 to 4, inclusive, it will be noted that the reference character 10 designates a seat, 11 indicates a support for the seat 10 and 12 designates a supporting unit for the seat. The seat supporting unit 12 comprises a helical coil spring 13 and a tubular direct acting shock absorber 14.

The seat selected for the purpose of illustrating this invention is an individual truck type seat although it will be apparent as this description proceeds that the invention is equally applicable to practically any type of vehicle seat. In detail, the seat 10 comprises a base portion 15 and a back portion 16 rigidly secured to the base portion 15 at the rear side of the latter by means of brackets 17. The seat 10 is mounted on the support 11 for sliding movement relative to the support fore-and-aft of the vehicle. For this purpose a pair of tracks 18 are secured to the underside of the base 15 and extend for substantially the full length of the base 15 in parallel lateral spaced relationship. The tracks 18 are fashioned to receive rollers 19 carried by the support 11 in spaced relation to each other longitudinally of the tracks 18 and suitable stops 20 are respectively provided in the tracks 18 between the rollers 19 engaging each track so as to limit the extent of sliding movement of the seat in opposite directions relative to the support 11.

The seat is held in any one of a number of positions of adjustment by means of a plunger 21 positioned for selective engagement in suitable openings 22 formed in a part of the support 11. As shown in Figure 3, the plunger 21 is mounted in a bracket 23 secured to the bottom of one of the tracks 18 for movement as a unit with the seat. The plunger 21 is normally urged toward its locking position by means of a spring 24 and the outer end of the plunger is connected to an operating arm 25 intermediate the ends of the latter. The rear end of the arm 25 is pivoted on the bracket 23 by a pin 23' in spaced relation to the plunger 21 and the forward end of the arm extends to a position adjacent the front side of the seat where it may be conveniently manipulated by the occupant of the seat. It follows from the above construction that swinging movement of the arm 25 about its pivotal connection with the bracket in a direction laterally outward from the adjacent side of the seat withdraws the plunger 21 from one of the openings 22 against the action of the spring 24 and enables the seat to be moved forwardly or rearwardly on the rollers 19. A suitable guide 26 is secured to the underside of the base 15 adjacent the front side of the seat and this guide is slotted to receive the operating arm 25.

The support 11 for the seat comprises two sections 27 and 28 respectively secured to the flooring 29 of the vehicle and to the base 15 of the seat. The section 28 comprises laterally spaced plates 30 which project beyond the rear side of the seat and carry the rollers 19 previously described as supporting the seat 10. It will also be noted that one of the plates is formed with the openings 22 which cooperate with the plunger 21 on the seat to hold the latter in any one of its adjusted positions.

The section 27 is also provided with laterally spaced plates 31 secured to the flooring 29 and respectively located in common planes with the plates 30. As shown in Figure 1, the adjacent edges of the plates 30 and 31 are substantially parallel to each other and are spaced to enable vertical movement of the section 28 or seat 10 relative to the section 27.

The front edges of the plates 30 and the adjacent edges of the plates 31 are inclined rearwardly from the front side of the seat. This construction enables the major portion of the section 27 to occupy a position beneath the seat so that the over-all length of the seat assembly is reduced to the minimum. Also the inclined edges of the plates 31 serve as a positive stop to limit the extent of downward movement of the seat 10 relative to the supporting section 27.

The two supporting sections are connected together by two pairs of arms 32 and 33 respectively positioned adjacent the laterally spaced plates 30, 31 of the supports. The arms of each pair are arranged in parallel relationship and the opposite ends of the arms are respectively pivotally connected to the plates 30 and 31. In detail, the front ends of the arms 32 are journaled on a pin 34 which extends transversely through the plates 31 and the rear ends of the arms 32 are journaled on the pin 35 having the opposite ends respectively anchored in the plates 30. The front ends of the arms 33 are journaled on a similar pin 36 having the opposite ends respectively mounted in the plates 31 directly above the pin 34 and having the rear ends respectively journaled on a pin 37 carried by the plates 30 directly above the pin 35. As stated above, the arms 32 are parallel to the arms 33 so that vertical movement of the seat is substantially resricted to a straight line path of travel.

The spring supporting unit 12 is positioned at the rear of the seat 10 and the spring 13 extends upwardly between the rear ends of the plates 30. The lower end of the spring is seated on the flooring 29 of the vehicle and the upper end of the spring reacts on the section 28 of the seat support, tending to hold the seat in spaced relation to the supporting section 27.

Upon reference to Figure 2, it will be noted that the upper end of the spring 13 abuts a plate 38 which in turn is connected to the lower end of a screw 39 having a hand engaging wheel 40 at the top thereof. The intermediate portions of the screw 39 are threaded in a nut 41 carried by an inverted U-shaped bracket 42 having the opposite leg portions 43 respectively secured to the portions of the plates 30 extending rearwardly from the seat.

The connection between the lower end of the screw 39 and the plate 38 is such as to enable rotation of the screw relative to the plate. In detail, a washer 44 is secured to the lower end of the screw and seats in a recess 45 formed in the top surface of the plate 38. A ring 46 is clamped to the plate 38 by studs 47 and the internal diameter of the ring is sufficiently less than the diameter of the recess 45 to permit the inner portion of the ring to overlap the peripheral portions of the washer 44. As a result, the washer 44 is rotatably retained in the recess 45 and rotation of the screw 39 relative to the plate 38 causes the nut 41 together with the seat 10 to move upwardly or downwardly depending upon the direction of rotation of the screw. This arrangement enables the elevation of the seat 10 to be varied by merely manipulating the hand wheel 40 which is located directly in rear of the seat back 16.

The action of the spring 13 is controlled by the shock absorber 14 which is of the direct acting tubular type and extends through the coil spring 13. Referring again to Figure 2 of the drawings, it will be noted that the upper end of the shock absorber is connected to the central portion of the plate 38 and the lower end of the shock absorber is connected to the flooring 29 of the vehicle. The location of the shock absorber within the spring 13 is important in that it reduces the size of the unit to a minimum and the location of the shock absorber at the rear of the seat is important in that it resists any tendency for the seat to "pitch" forward when subjected to shocks resulting from uneven or rough road surfaces. Also the location of both the spring and shock absorber at the rear of the seat enables obtaining maximum spring and shock absorber travel without interfering with the elevation of the seat.

While any one of a number of different types of direct acting shock absorbers may be employed in the seat assembly described above, nevertheless, the type shown in Figure 4 of the drawings is selected for the purpose of illustration. Briefly, the shock absorber 13 comprises a pressure cylinder 50 and an outer casing 51 cooperating with the pressure cylinder to provide a reservoir 52 for a hydraulic fluid medium. The lower end of the reservoir is closed by a cap 53 having a stud 54 welded or otherwise secured thereto and enabling securing the lower end of the shock absorber to the vehicle body flooring 29. The upper end of the reservoir is closed by a suitable plug 55 which is centrally apertured to receive a piston rod 56 havig a piston 57 secured to the lower end thereof.

The piston 57 is provided with an outer series of ports 58 and with an inner series of ports 59. The outer series of ports 58 are normally closed by a check valve 60 and the inner series of ports 59 are normally closed by a laminated pressure relief valve 61 which is clamped to the bottom of the piston by means of the spring 62. The above construction is such as to enable relatively free flow of fluid through the piston in an upward direction and to provide more restricted flow downardly through the piston. Also provision is made for adjusting the tension of the spring 62 so that the recoil action of the shock absorber may be varied.

The lower end of the cylinder 50 is closed by a valve 63 having a central opening 64 communicating with the reservoir 52 and having a series of ports 65 surrounding the central opening 64 and also communicating with the reservoir. The flow of fluid into the cylinder 50 through the central opening 56 is controlled by a check valve 66 and the flow of fluid from the cylinder to the reservoir through the ports 65 is regulated by a laminated pressure relief valve 67. As a result of this construction, fluid is permitted to flow relatively freely from the reservoir to the cylinder 50 and the flow of fluid in the opposite direction from the cylinder 50 to the reservoir 52 is restricted to a substantial degree.

In operation when the piston 57 travels downwardly, the fluid in the cylinder 50 below the piston passes upwardly through the series of ports 58 and the pressure of this fluid unseats the check valve 60 to enable the fluid to enter the portion of the cylinder above the piston. Due to the fact that the piston rod 56 occupies a position in the portion of the cylinder above the piston 57, it follows that the available space in this portion of the cylinder is less in volume than the space below the piston. Thus as the piston continues to move in a downward direction in the cylinder, sufficient pressure is built up against the valve 67 to unseat the latter and permit the excess fluid to flow into the reservoir 52.

On the other hand, when the piston moves in an upward direction in the cylinder 50, fluid under pressure acts on the relief valve 61 to open the latter and permit fluid under pressure to flow into the portion of the cylinder below the piston. As the piston 57 travels upwardly in the cylinder, the piston rod 56 moves out of the cylinder and therefore it is necessary to replenish the cylinder with a quantity of hydraulic fluid medium. The required additional amount of fluid is supplied by the reservoir 52 through the check valve 66 which opens relatively freely so that very little or no resistance is offered to the flow of fluid into the cylinder. From the above brief description of the shock absorber, it will be apparent that the construction is such as to materially dampen shocks transmitted to the seat 10 through the spring 13.

The embodiment of the invention shown in Figures 5 and 6 differs from the one previously described in the manner in which vertical adjustment of the seat is obtained. In the modified construction, vertical adjustment of the seat is effected by a vertical screw 70 having the lower end secured to the seat supporting section 28 and having the upper end projecting through a lateral extension 71 of the spring abutment plate 72. The upper end of the screw is threaded and a nut 73 is rotatably secured to the plate 72 in threaded contact with the screw. As a result, rotation of the nut 73 relative to the screw 70 in opposite directions raises and lowers the seat 10.

The embodiment of the invention shown in Figures 7 to 9 inclusive shows still another method of adjusting the elevation of the seat 10 relative to the vehicle body flooring 29. In detail, an inverted substantially U-shaped bracket 75 is positioned between the rearwardly extending portions of the plates 30 and the legs 76 of the bracket respectively slidably engage the inner sides of the plates 30. The base portion 77 of the bracket forms an abutment for the upper end of the coil spring 13 and also forms an anchorage for the upper end of the shock absorber 14. The front edges of the leg portions 76 are formed with rack teeth 78 and selectively engage a pair of dogs 79 fixed to a shaft 80. The shaft 80 extends transversely of the plates 30 in advance of the unit 12 and one end of the shaft is supported in an opening in the adjacent plate 30 while the other end of the shaft is supported by a cup-shaped member 81 secured to the inner side of the other plate 30 forming a housing with the latter for the adjacent dog 79. A cup-shaped member 81' is secured to the supporting plate 30 in opposed relation to the cup-shaped member 81 and the shaft 80 extends through the member 81'.

The dogs 79 are normally held in operative engagement with their respective rack teeth 78 by a spring 82 surrounding the shaft 80. One end of the spring 82 abuts the base of the cup-shaped member 81 and the opposite end of the spring engages a washer 83 fixed to the shaft 80. The arrangement is such that when the dogs 79 are in engagement with their respective rack teeth 78, the seat is held at the selected elevation and when it is desired to change this elevation the shaft 80 is merely pulled outwardly by the handle 84. Suitable projections 85 are provided on the free end of the shaft 80 for limiting the extent of axial movement of the shaft by the handle 84. The allowable axial travel, however, is sufficient to disengage the dogs 79 from the adjacent rack teeth 78. In this connection, it will be noted that the part 30 adjacent the handle 84 is formed with an opening 86 for receiving the adjacent dog 79 when the latter is in its inoperative position and the cup shaped member 81' is formed with an opening 86' for receiving the adjacent dog 79 when the shaft is axially moved to place the dogs in their inoperative position out of engagement with the rack teeth 78. The seat may then be raised or lowered the desired distance by merely lifting or pushing the seat downwardly. When the desired adjustment is obtained, the spring 82 is released permitting the dogs to again engage the rack teeth and lock the seat in its adjusted position.

What I claim as my invention is:

1. A vehicle seat construction comprising a fixed supporting section, a vertically movable supporting section spaced above the fixed section and connected to the latter for movement relative thereto in a substantially straight line path of travel, a seat having a base positioned above the movable supporting section and connected to the latter for movement as a unit with the latter, a vertical adjusting screw rotatably supported on the movable seat supporting section beyond the rear edge of the seat and having the upper end thereof projecting above the seat section so as to be readily accessible to a seat rider an abutment rotatably connected to the lower end of said screw whereby the elevation of said movable supporting section may be adjusted by the rider while sitting on the seat, a coil spring supported under compression between the abutment and a relatively fixed part of the vehicle, and a direct acting tubular type shock absorber extending axially through the coil spring and having the opposite ends respectively connected to the relatively fixed part aforesaid of the vehicle and to said abutment.

2. A vehicle seat construction comprising a seat having a base portion supported above a part of a vehicle for movement toward and away from the latter part, means supported beneath the base portion of the seat for guiding movement of the seat in a substantially straight line path of travel, an abutment carried by the seat at the rear side of the latter and at an elevation above the base portion of the seat, a coil spring supported under compression between the abutment and part aforesaid of the vehicle, a tubular direct acting shock absorber extending axially through the spring and having the opposite ends respectively connected to the abutment and part aforesaid of the vehicle, and means for adjusting the seat on the abutment in a general vertical direction to vary the elevation of the seat relative to the part aforesaid of the vehicle.

3. A vehicle seat construction comprising a seat having a base portion supported above a fixed part of a vehicle for movement toward and away from the latter part, means for guiding movement of the seat in a substantially straight line path of travel, an abutment carried by the seat at the rear side of the latter, a coil spring supported at the rear side of the seat under compression between the abutment and fixed part of the vehicle, a tubular direct acting shock absorber extending axially through the coil spring and having the opposite ends respectively connected to the abutment and fixed part of the vehicle, and means for adjusting the seat on the abutment in a general vertical direction to vary the elevation of the seat relative to the fixed part of the vehicle.

BROUWER D. McINTYRE.

REFERENCES CITED

The following references are of record in the file of this patent:

UNITED STATES PATENTS

| Number | Name | Date |
| --- | --- | --- |
| 1,112,354 | Brooks | Sept. 29, 1914 |
| 1,960,939 | Hansen | May 29, 1934 |
| 2,201,280 | Yantes | May 21, 1940 |
| 2,272,124 | Lingle | Feb. 3, 1942 |
| 2,334,922 | Gustafson | Nov. 23, 1943 |
| 2,346,895 | Bergman | Apr. 18, 1944 |

FOREIGN PATENTS

| Number | Country | Date |
| --- | --- | --- |
| 41,938 | Holland | Nov. 15, 1937 |
| 154,369 | Great Britain | Dec. 2, 1920 |
| 299,207 | Great Britain | Oct. 25, 1925 |
| 556,818 | France | July 27, 1923 |
| 687,271 | France | Aug. 6, 1930 |